Aug. 3, 1971  H. W. WEBER, JR., ET AL  3,597,154
RECOVERY AND PURIFICATION OF COPPER SULFATE
Filed Sept. 20, 1968  6 Sheets-Sheet 1

INVENTORS
HARRY W. WEBER JR
CARROLL J. WENZKE
ALICE L. HANSEN
BY

US 3,597,154
Patented Aug. 3, 1971

3,597,154
RECOVERY AND PURIFICATION OF
COPPER SULFATE
Harry W. Weber, Jr., Baltimore, Md., Carroll Jerome
  Wenzke, deceased, late of Peekskill, N.Y., by Winifred
  R. Wenzke, administratrix, Peekskill, N.Y., and Alice
  Laverne Hansen, Baltimore, Md., assignors to FMC
  Corporation, New York, N.Y.
Filed Sept. 20, 1968, Ser. No. 764,024
Int. Cl. C01g 3/10, 3/00, 3/02
U.S. Cl. 23—50                        6 Claims

ABSTRACT OF THE DISCLOSURE

This application discloses a process for recovering cupric sulfate from solutions containing water soluble impurities such as sulfuric acid and sodium sulfate. The cupric sulfate is precipitated by an alkali metal hydroxide or alkaline earth metal hydroxide at a temperature above about 70° C. as dibasic copper sulfate $CuSO_4 \cdot 2Cu(OH)_2$. The dibasic copper sulfate precipitate is treated with a stoichiometric amount of sulfuric acid to regenerate cupric sulfate. The cupric sulfate is recovered by cooling the solution to precipitate crystalline cupric sulfate pentahydrate.

BACKGROUND OF THE INVENTION (A) Field of the invention

Recovery of cupric sulfate from solutions containing dissolved copper sulfate, water-soluble impurities and sulfuric acid.

(B) Description of the prior art

Many industrial chemical processes produce wash solutions or other waste solutions containing dissolved cupric sulfate. Because copper is valuable it is desirable to recover the copper values from these solutions. Often the wash solutions contain the copper dissolved in the form of sulfate along with other materials such as sodium sulfate, small amounts of sulfuric acid and other water-soluble impurities.

It is known that cupric sulfate may be precipitated from a solution as basic copper sulfate by the addition of an alkali such as sodium hydroxide. The precipitation is substantially complete when sufficient alkali has been added to bring the pH up to about 7. Unfortunately, the precipitate so obtained is gelatinous, bulky, difficult to filter and therefore undesirable from a processing standpoint.

It is reported in U.S. Pat. No. 2,061,194 that a dense granular precipitate of basic copper sulfate can be obtained if the precipitation of cupric sulfate by an alkali is conducted in two or more stages with a time interval between the stages. The preferred process employs at least two stages and the liquid from the second stage, containing the precipitate in suspension, overflows into a settling tank where the precipitate settles and periodically is pumped out of the bottom of the settling tank and recovered.

SUMMARY OF THE INVENTION

A process has been discovered for recovering cupric sulfate in an essentially quantitative yield from an aqueous cupric sulfate solution containing sulfuric acid, sodium sulfate and small amounts of other water-soluble impurities. Sodium hydroxide, potassium hydroxide, calcium hydroxide, strontium hydroxide or barium hydroxide is added to the cupric sulfate solution at a temperature above about 70° C. to neutralize sulfuric acid and precipitate the copper in a single precipitation step as very insoluble, dense, dibasic copper sulfate, $$CuSO_4 \cdot 2Cu(OH)_2$$

This process is so efficient that no more than 11 parts per million of copper remain in solution after treatment. The precipitated insoluble dibasic copper sulfate is separated, washed, and treated with a stoichiometric quantity of aqueous sulfuric acid to regenerate aqueous cupric sulfate free from sodium sulfate, water soluble impurities and sulfuric acid. Pure crystalline cupric sulfate pentahydrate can be crystallized from this solution.

A preferred method of conducting the present process reduces the amount of alkali metal hydroxide or alkaline earth metal hydroxide and sulfuric acid consumed. The preferred process combines recovered dibasic copper sulfate in a regenerating zone with hot aqueous solution containing copper sulfate, sodium sulfate, and sulfuric acid. The sulfuric acid reacts with the dibasic copper sulfate to regenerate cupric sulfate. At this point a solution will exist if sodium hydroxide or potassium hydroxide was used to precipitate the basic copper sulfate. If an alkaline earth metal hydroxide was used to precipitate the dibasic copper sulfate, a slurry in which the solid material is alkaline earth metal sulfate will exist. If a slurry exists the solid alkaline earth metal sulfate is removed and discarded. The solution from the regenerating zone is then cooled to precipitate essentially pure crystalline cupric sulfate pentahydrate. The crystallized cupric sulfate pentahydrate is separated and dried. The remaining solution containing dissolved cupric sulfate, sodium sulfate and any sulfuric acid not neutralized in the regeneration of cupric sulfate from dibasic copper sulfate is treated at above about 70° C., preferably at 75° C. or higher, with an alkali metal or alkaline earth metal hydroxide to neutralize the sulfuric acid and precipitate the remaining copper as dibasic copper sulfate. The precipitate is separated, washed, and recycled to the regenerating zone.

This novel process has several important advantages over prior art processes for recovering cupric sulfate from aqueous solutions. The cupric sulfate is efficiently recovered so that a maximum of 11 parts per million of copper remains in solution after precipitation of the dibasic copper sulfate. The copper values may be recovered as dibasic copper sulfate, pure crystalline cupric sulfate pentahydrate or as an aqueous solution of cupric sulfate. The waste disposal problems of solutions containing copper sulfate and sulfuric acid are eliminated.

DESCRIPTION OF THE INVENTION AND THE PREFERRED EMBODIMENTS

Figure 1:
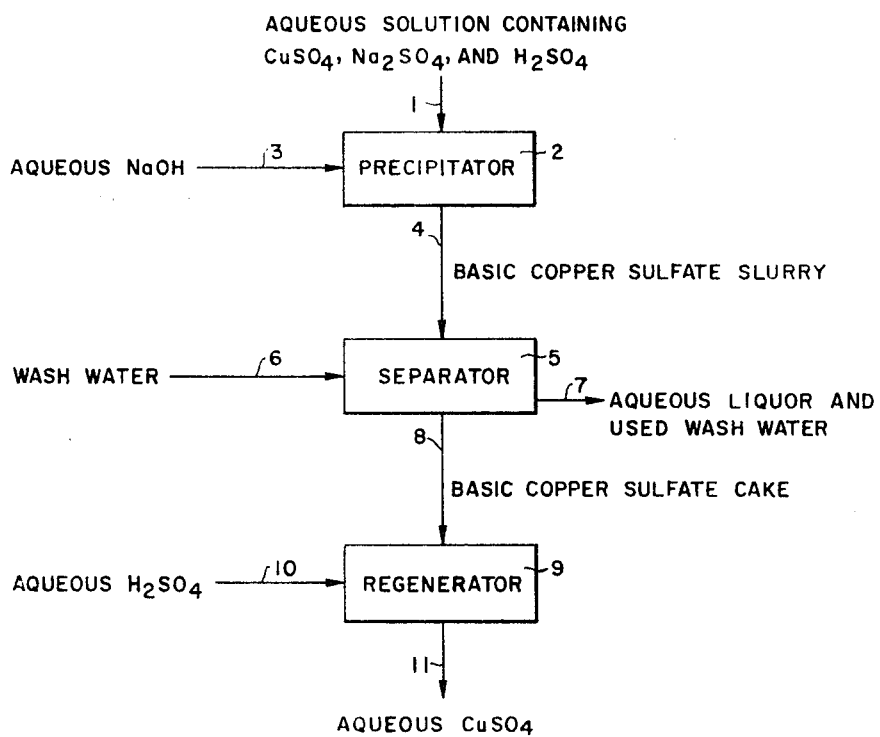
FIGS. 1 and 2 are schematic flow sheets illustrating treatment of an aqueous solution containing cupric sulfate, sodium sulfate and sulfuric acid to obtain a solution of cupric sulfate free from sodium sulfate and sulfuric acid.

The present process is useful for the separation of sodium sulfate, sulfuric acid, and other water-soluble impurities from aqueous cupric sulfate solutions. Hydroxides, carbonates, or bicarbonates of sodium, potassium, barium, calcium or strontium may be used to neutralize sulfuric acid and to precipitate copper as dibasic copper sulfate from the aqueous acid solution containing cupric sulfate at a temperature above about 70° C. and preferably above 75° C. Sodium hydroxide and calcium hydroxide are the preferred reactants for use in this invention because of availability and low cost.

The following equations illustrate generally the reactions illustrate generally the reactions to produce the dibasic copper sulfate:

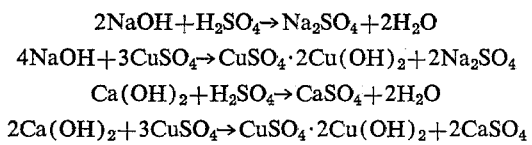

Sulfuric acid is used to regenerate cupric sulfate from the dibasic copper sulfate. The use of a reactant other than sulfuric acid for this purpose is not within the scope of this invention. The following equation illustrates the regeneration reaction:

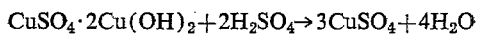

When sodium hydroxide or potassium hydroxide is added to the aqueous effluent solution to neutralize the sulfuric acid and precipitate the dibasic copper sulfate soluble sodium or potassium sulfate forms as a result of the reaction of the hydroxide with the sulfuric acid and with the cupric sulfate. This sodium or potassium sulfate and the sodium sulfate initially present in the aqueous effluent remain in the aqueous solution. The small amount of alkali metal sulfate mixed with the precipitated dibasic copper sulfate may be reduced to any desired level or almost entirely removed from the dibasic copper sulfate precipitate by sufficient washing with water.

When an alkaline earth metal hydroxide, such as calcium hydroxide, is added to the hot aqueous effluent solution to neutralize the sulfuric acid and precipitate the copper as dibasic copper sulfate, alkaline earth metal sulfate precipitates as a result of the reaction of the hydroxide with the sulfuric acid and also with the cupric sulfate. Thus, the precipitate is a mixture of dibasic copper sulfate and alkaline earth metal sulfate. The aqueous solution is separated from the mixed precipitate and the precipitate is washed with water to remove residual alkali metal sulfate. When the mixed precipitate is treated with aqueous sulfuric acid the dibasic copper sulfate is converted to soluble cupric sulfate whereas the alkaline earth metal sulfate remains as a precipitate. The alkaline earth metal precipitate is removed, for example by filtering or centrifuging, and an aqueous solution of cupric sulfate is obtained.

The concentration and amounts of the reactants must be such that after the dibasic copper sulfate is precipitated the alkali metal sulfate remains in solution. Efficient mixing is desirable, and necessary when concentrated hydroxide solutions are used, for example 50% caustic, as local high hydroxide concentrations can produce cupric oxide. Cupric oxide is undesirable as it is difficult to filter and consumes more hydroxide in its formation and more sulfuric acid when converted to cupric sulfate than does dibasic copper sulfate.

Enough sodium hydroxide or calcium hydroxide must be added to exactly neutralize the sulfuric acid present in an effluent and to exactly precipitate all the copper present as dibasic copper sulfate. Sodium or potassium hydroxide may be added as aqueous solutions of any desired concentration or in solid form. It is advantageous to add the alkali metal hydroxide as a 15–20% aqueous solution to facilitate mixing with the copper-containing solution being treated. For the same reason we prefer to add calcium hydroxide as a 15–20% slurry in water. However, the calcium hydroxide can be added as an aqueous slurry of greater or lesser concentration, as a solution of calcium hydroxide in water, or as a solid. Calcium oxide can be substituted for calcium hydroxide.

The dibasic copper sulfate precipitate is treated with the stoichiometric amount of sulfuric acid to regenerate cupric sulfate. The solution formed must be dilute enough to dissolve all the regenerated cupric sulfate at the regeneration temperature. The sulfuric acid may be introduced in any concentration that fulfills this condition. Sulfuric acid and water to effect the necessary dilution may be added separately.

A specific and preferred embodiment of the present process reduces the amount of hydroxide and sulfuric acid consumed where the copper to be recovered is in a solution containing sulfuric acid and sodium sulfate. The recovered precipitate of dibasic copper sulfate from one recovery cycle is combined in a regenerating zone with hot aqueous effluent. The dibasic copper sulfate reacts with the sulfuric acid in the hot effluent thereby neutralizing the bulk of the sulfuric acid and converting the dibasic copper sulfate to cupric sulfate. At this point a solution will exist if sodium hydroxide or potassium hydroxide was used in the previous cycle to precipitate the basic copper sulfate. If an alkaline earth metal hydroxide was used to precipitate the dibasic copper sulfate, a slurry will exist in which the solid phase is an alkaline earth metal sulfate. In such a case the solid alkaline earth metal sulfate is removed and discarded. In either event the resulting solution is cooled to crystallize out essentially pure cupric sulfate pentahydrate which is separated and dried. The remaining solution containing some dissolved cupric sulfate, sodium sulfate and unconsumed sulfuric acid is treated with an alkali metal or alkaline earth metal hydroxide to neutralize the sulfuric acid and precipitate the remaining cupric sulfate as dibasic copper sulfate. The precipitate is separated, washed and recycled to the regenerating zone.

In the foregoing embodiment of the present process there is a limit on the concentration of sodium sulfate that can be permitted in the regeneration step. For sodium sulfate concentrations greater than 6%, the solubility limit of sodium salts is exceeded and these salts therefore contaminate the cupric sulfate pentahydrate which is subsequently crystallized from solution. Thus, where the combined sodium sulfate content of the incoming effluent stream and dibasic copper sulfate is greater than 6% of the combined weights, the sodium sulfate concentration must be adjusted to less than 6% by dilution with water. If enough sulfuric acid is not present in the incoming effluent to react with all of the dibasic copper sulfate to regenerate aqueous cupric sulfate, make-up sulfuric acid is added to the effluent to provide the stoichiometric quantity needed for cupric sulfate regeneration.

The temperature used for the precipitation of the dibasic copper sulfate is preferably any temperature between about 70° C. and the boiling point of the solution. The formation of tribasic copper sulfate occurs at temperatures below about 70° C. with the ratio of tribasic salt to dibasic salt increasing with decreasing precipitation temperature. At 60° C. dibasic copper sulfate is still the major component of the precipitate while at 45° C. tribasic copper sulfate is the major component. At 30° C. tribasic copper sulfate is formed almost exclusively. The tribasic copper sulfate is economically undesirable as more hydroxide is required to form the tribasic copper sulfate and more sulfuric acid is required to regenerate supric sulfate from the tribasic copper sulfate than from dibasic copper sulfate. Furthermore, the tribasic copper sulfate is undesirable as it is a great deal more difficult to separate from the reaction medium than is dibasic copper sulfate. Dibasic copper sulfate precipitated at 102° C. filtered 20 times as fast as the tribasic copper surface which was precipitated at 30 to 40° C. A portion of a sample precipitated at 30 to 40° C. was heated to 100° C. for several hours. This portion was then filtered and found to filter only four times as fast as a sample precipitated at 30 to 40° C. which was not digested at 102° C. Precipitation at a low temperature followed by digestion at a high temperature is not equivalent to precipitation at a high temperature. The high temperature degestion does not convert the tribasic copper sulfate to dibasic copper sulfate.

The continuous process has been found to produce a dibasic copper sulfate which filters better than dibasic copper sulfate produced in a batch process. The continuous process produces a more filterable salt because a pH value near 7 can be maintained throughout the precipitation whereas in the batch process the precipitation starts near a pH of 1 or 2 and continues while the pH rises to about 7.

The regeneration of cupric sulfate from dibasic copper sulfate is effected at a temperature which will result in total dissolution of the cupric sulfate formed. If the cupric sulfate is not kept in solution it will precipitate on the surface unreacted solid dibasic copper sulfate and inhibit the regeneration reaction. The minimum regeneration temperature will depend on the concentration of cupric sulfate. Because solubility of cupric sulfate increases with increasing temperature, higher temperatures will be needed for higher concentrations of cupric sulfate. Also, the rate of the regeneration reaction increases with increasing temperature. Although we find regeneration temperatures in the range of 40° C. to the boiling point of the mixture are practical, we prefer regeneration temperatures above 90° C. in order that more concentrated solutions of cupric sulfate can be handled, thereby permitting greater recovery of crystalline cupric sulfate pentahydrate on cooling.

The solution of regenerated cupric sulfate is cooled to precipitate crystalline cupric sulfate pentahydrate. The degree of cooling is dictated by economic considerations, that is the cost of cooling compared to the quantity of cupric sulfate pentahydrate recoverable with that degree of cooling. We have found that cooling to about 25° C. is preferred for efficient and economical recovery. Lower crystallization temperatures are of course permissible but are not required for an acceptable economic process. At lower crystallization temperatures refrigeration costs become an important economic factor.

Heat in the precipitation and regeneration stages is supplied by conventional means such as heating coils or heated jackets. Often, no heat from external sources will be necessary, as the heat generated by the exothermic reaction is sufficient to maintain the reaction mixtures at the desired temperatures if the incoming effluent is relatively hot. Similarly, cooling may be provided for the crystallization stage by any conventional means, such as cooling coils, cooling jackets, ice baths, and the like.

The entire process is conveniently operated at atmospheric pressure in open vessels. Subatmospheric or superatmospheric pressures could be used, however, it should be noted that the use of reduced pressure in the precipitator would lower the boiling point of the solution and could prevent the attainment of the desired temperature range of 70 to 100° C. in the step in which the dibasic copper sulfate is precipitated.

All of the materials used in this process are inorganic; the reactions therefore are ionic in character and very rapid. The reaction time in each step depends on the temperature, concentration of reactants, and rates of addition reactants. Addition of the reactants is controlled to avoid local high concentrations of the reactant being added and to permit the heat of the exothermic reactions to dissipate without causing boiling of the solution. Generally completion of the reactions is visually apparent. However, in the precipitation of dibasic copper, too short a reaction time has a detrimental effect on filtration. When an alkali metal hydroxide is used as the precipitating agent, reaction times as short as 12 minutes have been found to be acceptable. When an alkaline earth metal hydroxide is used as the precipitating agent, the reaction is somewhat slower because of its insolubility and reaction times of at least about 45 minutes are used. The precipitation reaction time may be extended as long as desired in either case.

The process may be conducted batchwise or continuously. We have found a precipitation residence time of about 15 minutes to be suitable in the continuous process though longer or shorter residence times may be used with good results. Preferably the residence time in the continuous process is controlled by adjusting the total flow rates of the two incoming streams of reactants, while the pH is maintained near neutrality by regulating the ratio of the flow rates of the two streams. Careful control of these variables produces a very dense dibasic copper sulfate that is easy to recover by filtration. Desirably the cupric sulfate pentahydrate is crystallized rather rapidly with stirring to avoid formation of macrocrystals. Where macrocrystals are not undesirable slower cooling without stirring is acceptable.

The general process for the recovery of essentially pure cupric sulfate in solution from an aqueous solution containing copper sulfate, sodium sulfate and sulfuric acid using an alkali metal hydroxide to precipitate dibasic copper sulfate is described with reference to FIG. 1. An aqueous solution containing dissolved cupric sulfate, sodium sulfate, and sulfuric acid is introduced through line 1 to precipitator 2. Concurrently, an aqueous solution of sodium hydroxide is admitted to precipitator 2 via line 3 to neutralize the sulfuric acid and precipitate the copper as dibasic copper sulfate. The slurry of solid dibasic copper sulfate in an aqueous solution of sodium sulfate is passed through line 4 to separator 5. In separator 5 the precipitate of dibasic copper sulfate is separated, for example, by filtering or centrifuging, from the aqueous liquor in which it is slurried. Water is admitted to separator 5 via line 6 to wash sodium sulfate from the cake of dibasic copper sulfate. Washing is continued until the amount of sodium sulfate in the dibasic copper sulfate cake is reduced to the desired level. The initial aqueous liquor and the used wash water are discarded via line 7. The dibasic copper sulfate cake is transferred from separator 5 via line 8 to regenerator 9. Aqueous sulfuric acid is introduced into regenerator 9 through line 10. An aqueous solution of regenerated cupric sulfate free from sulfuric acid and sodium sulfate is withdrawn from regenerator 9 through line 11.

Figure 2:
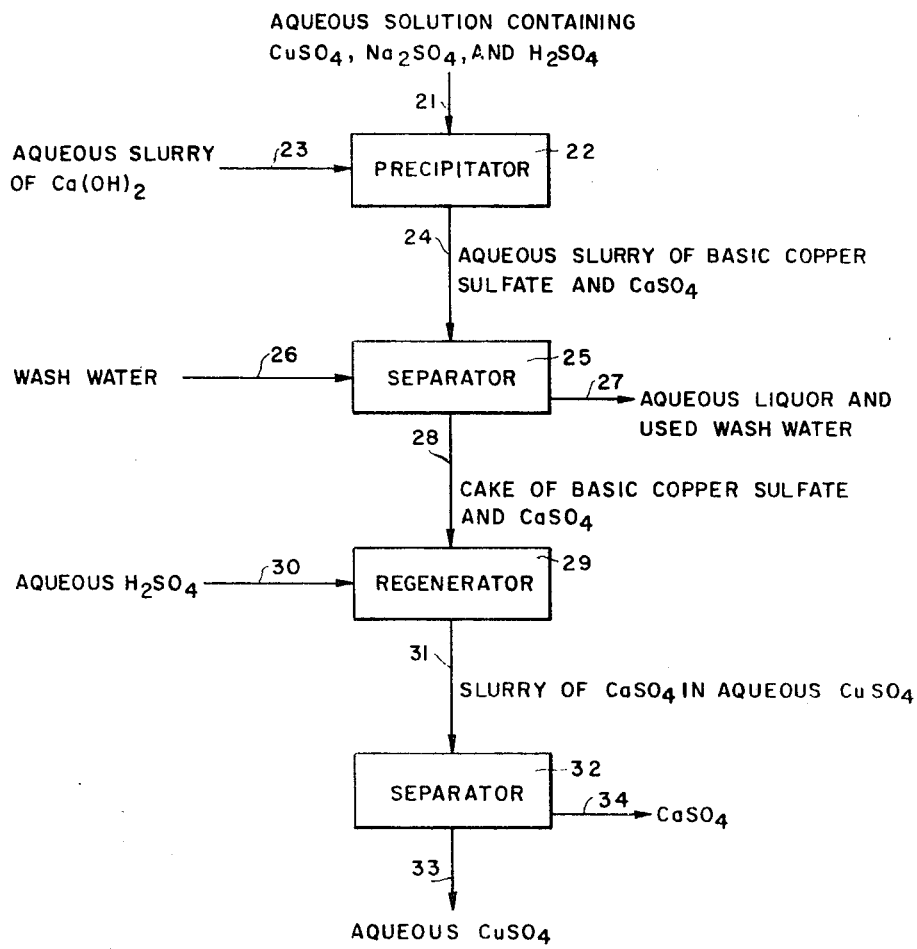

The general process for the recovery of an essentially pure cupric sulfate in solution from an aqueous solution containing copper sulfate, sodium sulfate and sulfuric acid using an alkaline earth metal hydroxide to precipitate dibasic copper sulfate is described with reference to FIG. 2.

An aqueous solution containing dissolved cupric sulfate, sodium sulfate, and sulfuric acid is introduced through line 21 into precipitator 22. Concurrently, an aqueous slurry of calcium hydroxide is admitted to precipitator 22 via line 23. The slurry formed in precipitator 22 of solid dibasic copper sulfate and solid alkaline earth metal sulfate in an aqueous solution of sodium sulfate is passed through line 24 to separator 25 where the solid material is separated, for example, by filtering or centrifuging, from the aqueous liquor in which it is slurried. Water is admitted to separator 25 via line 26 to wash the cake of dibasic copper sulfate and calcium sulfate until the amount of sodium sulfate in the cake is reduced to the desired level. The initial aqueous liquor and the used wash water are discarded via line 27. The cake of dibasic copper sulfate and alkaline earth metal sulfate is transferred from separator 25 via line 28 to regenerator 29. Aqueous sulfuric acid is introduced into regenerator 29 through line 30. A slurry of solid calcium sulfate in regenerated aqueous cupric sulfate is formed in regenerator 29 by the action of the aqueous sulfuric acid on the cake and transferred via line 31 to separator 32. Aqueous cupric sulfate solution is withdrawn from separator 32 via line 33 and solid calcium sulfate is removed through line 34.

Figure 3:
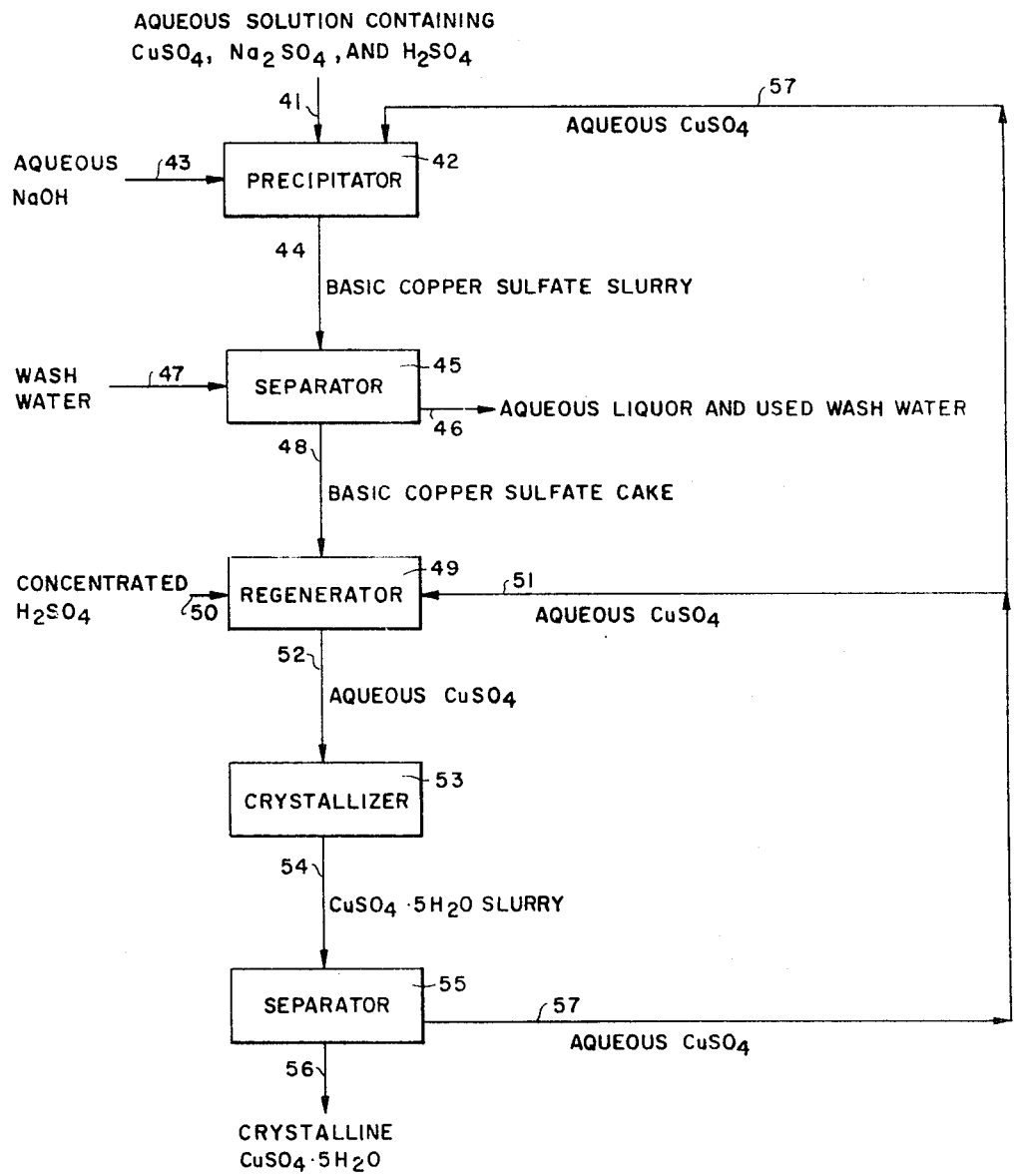
FIGS. 3 and 4 are schematic flow sheets illustrating the recovery of substantially pure crystalline cupric sulfate pentahydrate from an aqueous solution containing cupric sulfate, sodium sulfate and sulfuric acid.

The general process for the recovery of essentially pure crystalline cupric sulfate pentahydrate from an aqueous solution containing copper sulfate, sodium sulfate and sulfuric acid using an alkaline metal hydroxide to precipitate dibasic copper sulfate is described with reference to FIG. 3.

An aqueous solution containing dissolved cupric sulfate, sodium sulfate, and sulfuric acid is introduced through line 41 to precipitator 42. Aqueous sodium hydroxide is admitted concurrently to precipitator 42 via line 43. The sulfuric acid in the stream introduced through line 41 is neutralized by the sodium hydroxide and the copper is precipitated as dibasic copper sulfate. The slurry thus formed of solid dibasic copper sulfate in aqueous sodium sulfate is moved from precipitator 42 via line 44 to separator 45 where the aqueous liquor is removed from the dibasic copper sulfate slurry and discharged via line 46. Water to wash sodium sulfate from the dibasic copper sulfate cake is admitted to separator 45 by line 47 and the used wash water is removed through line 46. The washed dibasic copper sulfate cake is transferred from separator 45 via line 48 to regenerator 49. Concentrated sulfuric acid is introduced through line 50 into regenerator 49 and aqueous cupric sulfate recycled from a later step in the process is introduced through line 51 into regenerator 49. Aqueous cupric sulfate, both that added to regenerator 49 through line 51 and that resulting from the action of the sulfuric acid on the dibasic copper sulfate cake, is withdrawn from regenator 49 through line 52 and fed into crystallizer 53. In crystallizer 53, the aqueous solution of cupric sulfate is cooled to produce a slurry of precipitated cupric sulfate pentahydrate in aqueous cupric sulfate. The slurry is discharged from crystallizer 53 through line 54 to separator 55. Aqueous cupric sulfate is separated from the cupric sulfate pentahydrate precipitate in separator 55, withdrawn via line 57, and split, with the major fraction being recycled via line 51 to regenerator 49 to provide sufficient water for the regeneration step. The minor fraction is recycled via line 57 to precipitator 42. Crystalline cupric sulfate pentahydrate is withdrawn from separator 55 via line 56.

Figure 4:
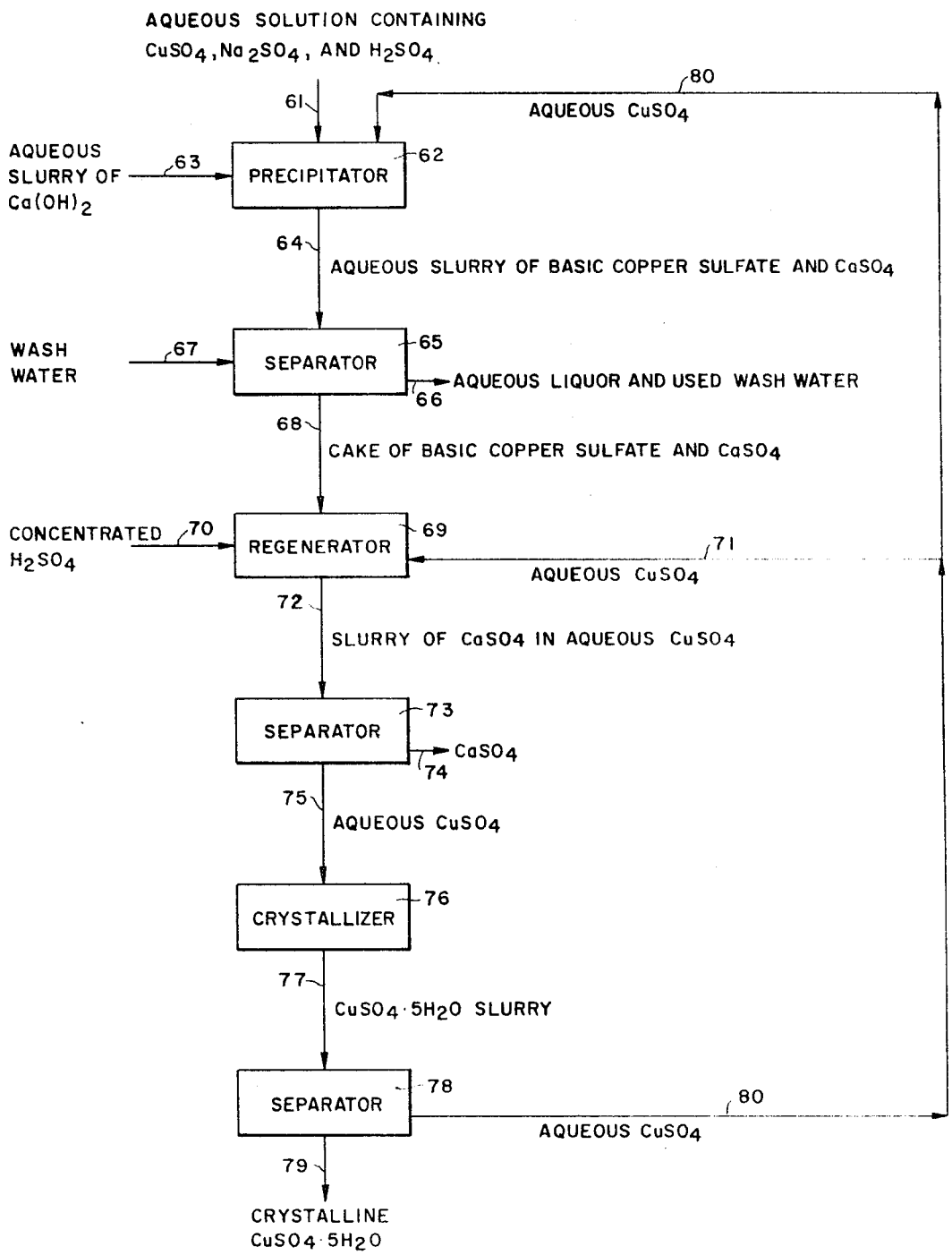

The general process for the recovery of essentially pure crystalline cupric sulfate pentahydrate from an aqueous solution containing copper sulfate, sodium sulfate and sulfuric acid using an alkaline earth metal hydroxide to precipitate dibasic copper sulfate is described with reference to FIG. 4.

An aqueous solution containing dissolved cupric sulfate, sodium sulfate, and sulfuric acid is introduced through line 61 to precipitator 62. Aqueous calcium hydroxide slurry is admitted concurrently to precipitator 62 via line 63. The sulfuric acid in the stream introduced through line 61 is neutralized by the calcium hydroxide and forms a precipitate of calcium sulfate while the copper is precipitated as dibasic copper sulfate. The resulting slurry composed of solid dibasic copper sulfate and calcium sulfate in aqueous sodium sulfate is moved from precipitator 62 through line 64 to separator 65 where the aqueous liquor is removed from the solid dibasic copper sulfate and calcium sulfate and discharged via line 66. Water to dash sodium sulfate from the cake of basic copper sulfate and calcium sulfate is admitted to separator 65 by line 67 and the used wash water is removed through line 66. The washed cake of dibasic copper sulfate and calcium sulfate is transferred from separator 65 via line 68 to regenerator 69. Concentrated sulfuric acid is introduced through line 70 into regenerator 69 and aqueous cupric sulfate recycled from a later step in the process is introduced through line 71 into regenerator 69. A slurry of solid calcium sulfate in aqueous cupric sulfate is withdrawn from regenerator 69 through line 72 and passed to separator 73. Solid calcium sulfate leaves separator 73 through line 74. The aqueous solution of cupric sulfate is removed from separator 73 via line 75 and introduced into crystallizer 76 where the aqueous cupric sulfate solution is cooled to form a slurry of precipitated crystalline cupric sulfate pentahydrate in a solution of aqueous cupric sulfate. The slurry is transferred from crystallizer 76 by line 77 to separator 78. Crystalline cupric sulfate pentahydrate is removed from separator 78 through line 79. The aqueous mother liquor containing dissolved cupric sulfate is drawn from separator 78 through line 80; enough of the aqueous cupric sulfate is recycled via line 71 to regenerator 69 to provide the water necessary for the regeneration step and the remainder of the aqueous cupric sulfate is recycled via line 80 to precipitator 62.

Figure 5:
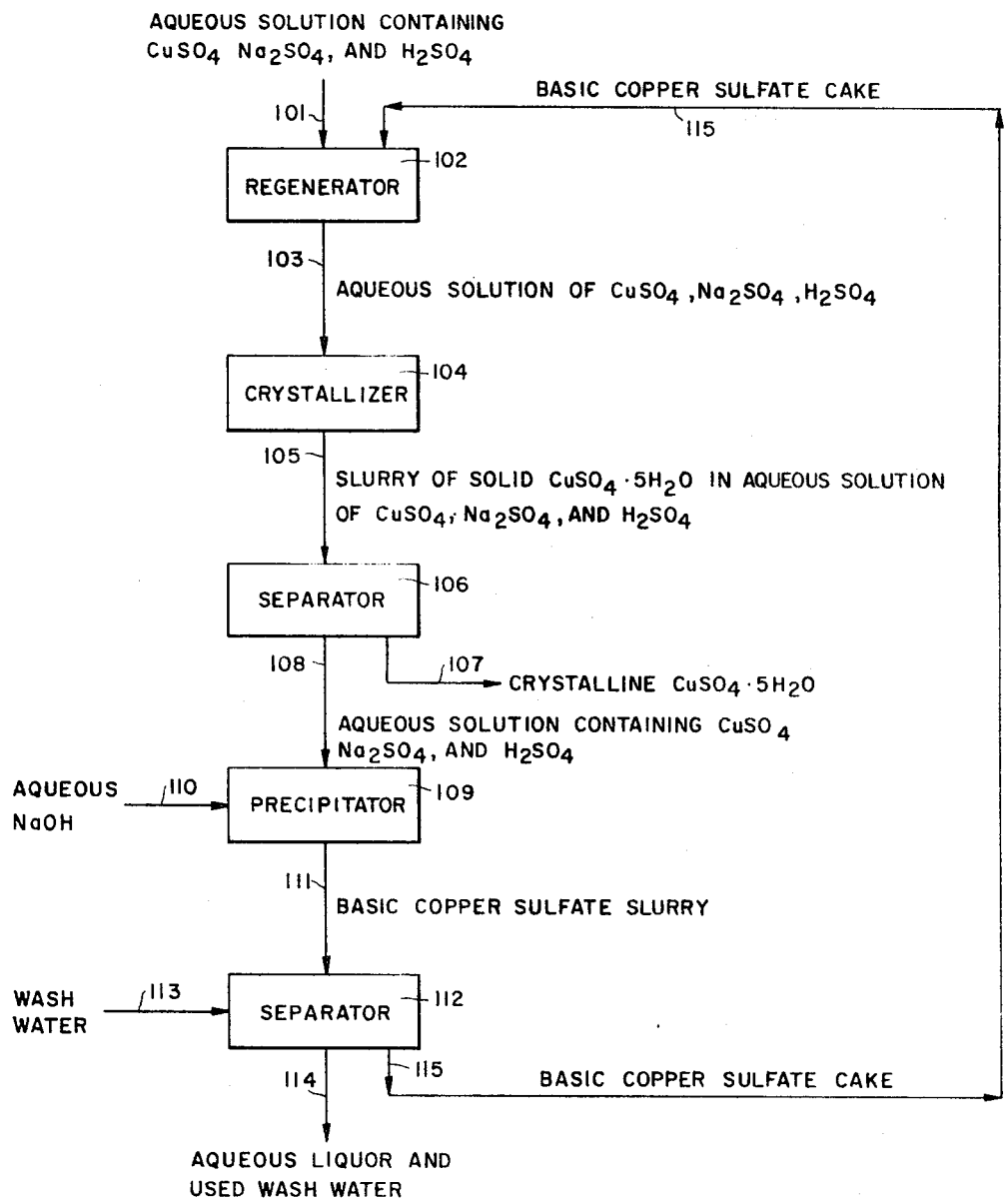
FIGS. 5 and 6 are schematic flow sheets illustrating the recovery of substantially pure crystalline cupric sulfate pentahydrate from an aqueous solution containing cupric sulfate, sodium sulfate and sulfuric acid using recycled dibasic cupric sulfate cake.

The process for the recovery of essentially pure crystalline cupric sulfate pentahydrate from a solution containing cupric sulfate, sodium sulfate and sulfuric acid using an alkaline earth metal hydroxide to precipitate basic copper sulfate and recycling dibasic copper surface cake as part of the process is described with reference to FIG. 5.

An aqueous solution containing dissolved cupric sulfate, sodium sulfate, and sulfuric acid is introduced through line 101 into regenerator 102. At the same time, wet dibasic copper sulfate cake formed in a previous cycle is introduced into regenerator 102 through line 115. In regenerator 102 the bulk of the sulfuric acid reacts with the basic copper sulfate cake to regenerate cupric sulfate. The resulting aqueous solution, now containing sodium sulfate, the sulfuric acid not consumed in the regeneration of cupric sulfate, and cupric sulfate, both that regenerated from the basic copper sulfate plus that in the aqueous solution introduced through line 101, is withdrawn from regenerator 102 via line 103 and sent to crystallizer 104. In crystallizer 104, the solution is cooled to form a precipitate of cupric sulfate pentahydrate crystals slurried in the aqueous liquor. The slurry is transferred from crystallizer 104 via line 105 to separator 106. From separator 106 crystalline cupric sulfate pentahydrate is recovered through line 107 and the aqueous liquor is removed through line 108 to precipitator 109. Aqueous sodium hydroxide is admitted through line 110 to precipitator 109 in an amount which exactly neutralizes the sulfuric acid and exactly precipitates as the basic copper sulfate the cupric sulfate present in the aqueous liquor from separator 106. The slurry formed in precipitator 109 of dibasic copper sulfate in aqueous sodium sulfate is conveyed through line 111 to separator 112 where the aqueous liquor is removed, e.g., by filtering of centrifuging, and discharged through line 114. Water is admitted through line 113 to wash the dibasic copper sulfate cake until the sodium sulfate is reduced to the desired level. The used wash water is discharged through line 114. The washed dibasic copper sulfate cake is removed from separator 112 and recycled through line 115 to regenerator 102.

Figure 6:
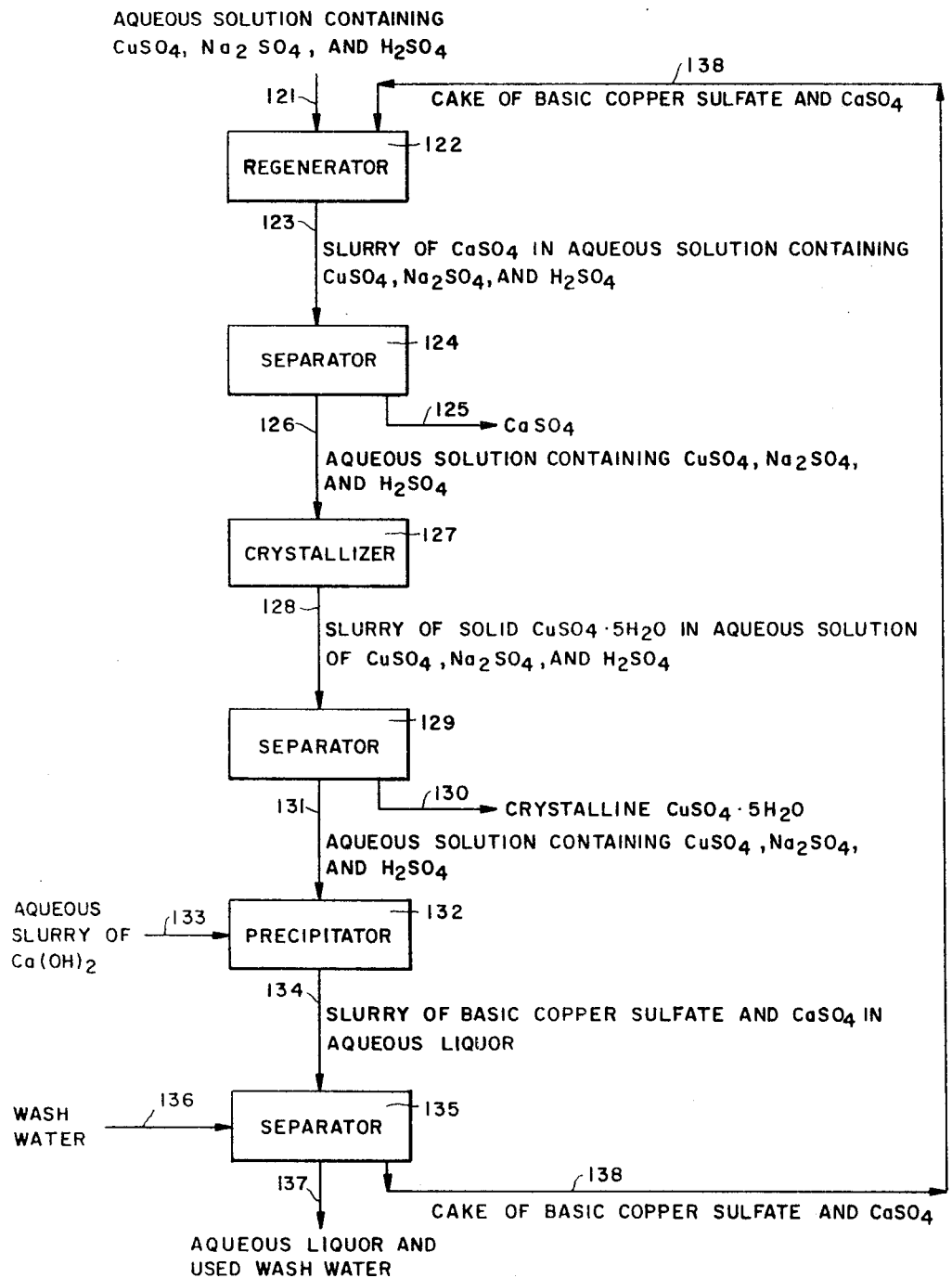

The process for the recovery of essentially pure crystalline cupric sulfate pentahydrate from an aqueous solution containing cupric sulfate, sodium sulfate and sulfuric acid using an alkaline earth metal hydroxide to precipitate the dibasic copper sulfate and using a recycle of dibasic copper sulfate is described with reference to FIG. 6.

An aqueous solution containing dissolved cupric sulfate, sodium sulfate, and sulfuric acid is introduced through line 121 into regenerator 122. At the same time, a wet cake of dibasic copper sulfate and calcium sulfate formed in a previous cycle is introduced into regenerator 122 through line 138. In regenerator 122 the bulk of the sulfuric acid reacts with the dibasic copper sulfate to regenerate cupric sulfate. The resulting slurry of solid calcium sulfate in an aqueous solution now containing sodium sulfate, the sulfuric acid not consumed in the regeneration of cupric sulfate, and cupric sulfate regenerated from the dibasic copper sulfate plus the cupric sulfate initially introduced in the aqueous solution, is withdrawn from regenerator 122 via line 123 and sent to separator 124. In separator 124, the solid calcium sulfate is separated from the aqueous solution and removed through line 125. The aqueous solution is transferred via line 126 to crystallizer 127. In crystallizer 127, the solution is cooled to form a precipitate of cupric sulfate pentahydrate crystals slurried in the aqueous liquor. The slurry is transferred from crystallizer 127 via line 128 to separator 129. From separator 129, crystalline cupric sulfate pentahydrate is recovered through line 130 and the aqueous liquor is removed through line 131 to precipitator 132. An aqueous slurry of calcium hydroxide is admitted through line 133 to precipitator 132 in an amount which exactly neutralizes the sufuric acid and exactly precipitates as dibasic copper sulfate the copper present in the aqueous liquor from separator 129. The aqueous slurry formed in precipitator 132 of solid dibasic copper sulfate and calcium sulfate is conveyed through line 134 to separator 135 where the aqueous liquor is removed, e.g., by filtering or centrifuging, and discharged through line 137. Water is admitted through line 136 to wash the cake of dibasic copper sulfate and calcium sulfate. The used wash water is discharged through line 137. The washed cake is removed from separator 135 and recycled through line 138 to regenerator 122.

The following examples illustrating the novel process of this invention are given without any intention of limiting the invention thereto. All parts and percentages are by weight.

EXAMPLE 1

Use of sodium hydroxide to precipitate dibasic copper sulfate

To an aqueous solution at 94° C. comprising 1456 parts of water, 358.8 parts of dissolved cupric sulfate, 94.0 parts of sulfuric acid, and 92.3 parts of sodium sulfate was added with stirring 1310.0 parts of a 15% by weight aqueous solution of sodium hydroxide, this quantity being that just sufficient to result in a final pH of 6.5. Stirring was continued for 10 minutes after the addition of sodium hydroxide was completed and the temperature of the mixture was maintained at 90° C. The resulting slurry was filtered to collect the dibasic copper sulfate precipitate. The filtrate, containing sodium sulfate and 11 parts per million of copper, was discarded. The filter cake of dibasic copper sulfate was washed with 532 parts of water after which the content of sodium sulfate in the filter cake was 2.4%. The washed dibasic copper sulfate cake was then dissolved in 1036 parts of 14.2% sulfuric acid at 90° C. to give an aqueous solution of 358.8 parts of cupric sulfate and 19.3 parts of sodium sulfate dissolved in 1456 parts of water.

EXAMPLE 2

Use of calcium hydroxide to precipitate dibasic copper sulfate

A slurriy of 182.0 parts of calcium hydroxide in 1031 parts of water was added with stirring to an aqueous solution at a temperature of 90° C. containing 358.8 parts of dissolved cupric sulfate, 94.0 parts of sulfuric acid, 92.3 parts of sodium sulfate, and 1456 parts of water. Stirring was continued for 45 minutes after the calcium hydroxide slurry was added and the temperature of the mixture was held at 90° C. The final pH of the system was 6.5. The resulting mixture was filtered to separate the mixed precipitate of dibasic copper sulfate and calcium sulfate. The filtrate, containing 9 parts per million of copper, was discarded. The mixed precipitate of dibasic copper sulfate and calcium sulfate was washed on the filter with 532 parts of water which reduced the sodium sulfate content to 0.4%. The washed mixed precipitate was treated with 606 parts of 24.3% sulfuric acid at 90° C. to regenerate cupric sulfate from the dibasic copper sulfate and from a slurry of calcium sulfate in aqueous cupric sulfate. The slurry was filtered and the calcium sulfate cake was washed three times with 150 parts of water each time. The combined filtrate and wash liquors contained 358.8 parts of cupric sulfate and 4.9 parts of sodium sulfate dissolved in 1456 parts of water.

EXAMPLE 3

Recovery of copper as crystalline cupric sulfate pentahydrate

A solution recycled from a previous run and composed of 59.0 parts of cupric sulfate, 26.7 parts of sodium sulfate, in 268 parts of water was combined with fresh incoming solution at a temperature of 94° C. consisting of 200.0 parts of cupric sulfate, 81.9 parts of sulfuric acid and 80.5 parts of sodium sulfate dissolved in 1382 parts of water to give a solution having a content of 259.0 parts of cupric sulfate, 81.9 parts of sulfuric acid, 107.2 parts of sodium sulfate, and 1650 parts of water. To this solution was added with stirring 766.8 parts of a 20% by weight solution of sodium hydroxide in water, this amount of caustic being just sufficient to give a final pH of 6.5. Stirring was continued for 15 minutes after the addition of sodium hydroxide was complete while the temperature of the mixture was maintained at 90° C. The resulting slurry was filtered to collect the precipitate of dibasic copper sulfate. The filtrate, containing sodium sulfate and 7 parts per million of copper, was discarded. The filter cake containing 191.0 parts of dibasic copper sulfate was washed with 384 parts of water to reduce the sodium sulfate content to 29.5 parts and then mixed with an aqueous solution of cupric sulfate and sodium sulfate recycled from a previous run and with 113.4 parts of concentrated (93.6%) sulfuric acid. The mixture was stirred at 90° C. until the dibasic copper sulfate precipitate dissolved. The resulting solution of 377.2 parts of regenerated cupric sulfate and 83.0 parts of sodium sulfate dissolved in 937 parts of water was cooled rapidly with stirring to 25° C. to precipitate crystalline cupric sulfate pentahydrate. The crystals were separated by filtration and dried to give 312.8 parts of cupric sulfate pentahydrate. The filtrate which consisted of 177.2 parts of cupric sulfate, 80.2 parts of sodium sulfate, and 805 parts of water was split into two streams. One stream (two-thirds of the filtrate) was recycled to the regeneration step (in which the dibasic copper sulfate precipitate is treated with sulfuric acid) to provide water for dilution. The remaining one third of the filtrate was recycled to the first step of the process and combined with fresh incoming aqueous acid cupric sulfate solution.

EXAMPLE 4

Recovery of copper as crystalline cupric sulfate pentahydrate and recycle of dibasic copper sulfate cake to treat hot incoming starting solution Wet, washed dibasic copper sulfate cake consisting of 131.3 parts of dibasic copper sulfate, 10.0 parts of sodium sulfate, and 252.5 parts of water was combined with fresh incoming solution at a temperature of 94° C. and consisting of 200.0 parts of cupric sulfate, 94.0 parts of sulfuric acid, and 73.0 parts of sodium sulfate dissolved in 658 parts of water. The mixture was stirred until the dibasic copper sulfate was completely dissolved. The solution was cooled to 25° C. with stirring to precipitate crystalline cupric sulfate pentahydrate. The resulting slurry was filtered and a filter cake of 312.8 parts of crystalline cupric sulfate pentahydrate, 6.2 parts of sodium sulfate decahydrate, 0.4 part of sulfuric acid, and 16.3 parts of water was obtained. The filtrate was composed of 177.2 parts of dissolved cupric sulfate, 21.0 parts of sulfuric acid, 80.2 parts of sodium sulfate, in 805 parts of water. To this filtrate was added with stirring 508.8 parts of a 15.0 weight percent solution of aqueous sodium hydroxide at 102° C.; this amount of caustic was just sufficient to give a final pH of 6.5. Stirring was continued for 15 minutes after the addition of sodium hydroxide was complete while the temperature of the solution was maintained at 90° C. The resulting slurry was filtered and the filtrate composed of 117.0 parts of sodium sulfate dissolved in 1021 parts of water was discarded. The filter cake was composed of 131.3 parts of dibasic copper sulfate, 38.8 parts of sodium sulfate, and 223.7 parts of water. The filter cake was washed with water to reduce the sodium sulfate content and the wet, washed filter cake consisting of 131.3 parts of dibasic copper sulfate, 10.0 parts of sodium sulfate, and 252.2 parts of water was recycled to the first step of the process and combined with fresh aqueous acid cupric sulfate solution.

Some of the sodium sulfate present in the starting aqueous effluent will often be present in the newly precipitated dibasic copper sulfate cake as an impurity. The sodium sulfate content may be reduced to any desired level or substantially removed by washing the cake with water. The present process may be operated either continuously or batch-wise. In batch operation the hydroxide is added to the cupric sulfate stream carefully to avoid formation of cupric hydroxide $Cu(OH)_2$ from cupric sulfate and excess sodium hydroxide or potassium hydroxide. The formation of cupric hydroxide is undesirable because it readily dehydrates to cupric oxide CuO which reacts rather slowly with additional cupric sulfate to form dibasic copper sulfate.

It will be apparent to those skilled in the art that numerous modifications and variations of the embodiments illustrated above may be made without departing from the spirit of the invention and the scope of the following claims.

What is claimed is:

1. The process of recovering copper values from a solution containing cupric sulfate, sulfuric acid and soluble impurities comprising contacting the cupric sulfate at a temperature above about 70° C. with an amount of a hydroxide selected from the group consisting of alkali metal hydroxides and alkaline earth metal hydroxides sufficient to neutralize the sulfuric acid and precipitate dense, granular, dibasic copper sulfate, $CuSO_4 \cdot 2Cu(OH)_2$.

2. The process of claim 1 in which the hydroxide is selected from the group consisting of sodium hydroxide, potassium hydroxide, calcium hydroxide, strontium hydroxide and barium hydroxide.

3. The process of claim 1 further comprising recovering the dense dibasic copper sulfate, reacting the recovered dense, dibasic copper sulfate with a stoichiometric quantity of sulfuric acid at a temperature of above 40° C. to produce dissolved copper sulfate and cooling the solution of dissolved copper sulfate to crystallize from the solution substantially pure crystalline cupric sulfate pentahydrate.

4. A cyclic process for recovering copper values from aqueous solutions containing sulfuric acid, dissolved cupric sulfate, and soluble impurities comprising:
  (a) reacting the sulfuric acid in the solution with dibasic copper sulfate $CuSO_4 \cdot 2Cu(OH)_2$ to regenerate cupric sulfate at a temperature above 40° C.;
  (b) cooling the solution to precipitate crystallized cupric sulfate pentahydrate;
  (c) recovering the crystallized cupric sulfate pentahydrate from the cooled solution;
  (d) heating the cooled solution to above about 70° C.;
  (e) adding to the heated solution sufficient alkali selected from the group consisting of alkali metal hydroxides and alkaline earth metal hydroxides to neutralize any remaining sulfuric acid in the solution and to exactly precipitate the cupric sulfate present in the heated aqueous solution as dibasic cooper sulfate $CuSO_4 \cdot 2Cu(OH)_2$;
  (f) separating the precipitated dibasic copper sulfate from the aqueous solution, and
  (g) recycling the precipitated dibasic copper sulfate to (a).

5. The process of claim 4 in which the hydroxide is selected from the group consisting of sodium hydroxide, potassium hydroxide, calcium hydroxide, strontium hydroxide and barium hydroxide.

6. The process of claim 4 in which the cupric sulfate solution contains sodium sulfate as a water-soluble impurity.

References Cited

UNITED STATES PATENTS

| | | | |
|---|---|---|---|
| 1,200,534 | 10/1916 | Schroter et al. | 23—125 |
| 2,206,889 | 7/1940 | Gulbrandsen | 23—125 |
| 2,758,013 | 8/1956 | Munekata | 23—125X |

FOREIGN PATENTS

| | | | |
|---|---|---|---|
| 40/5,051 | 6/1962 | Japan | 23—125 |

HERBERT T. CARTER, Primary Examiner

U.S. Cl. X.R.

23—125